US011567752B2

(12) United States Patent
Kulakovsky et al.

(10) Patent No.: US 11,567,752 B2
(45) Date of Patent: Jan. 31, 2023

(54) META DATA DRIVEN UPGRADES

(71) Applicant: EMC IP Holding Company LLC, Hopkinton, MA (US)

(72) Inventors: Alex Kulakovsky, Jerusalem (IL); Sally Golan, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/364,927

(22) Filed: Jul. 1, 2021

(65) Prior Publication Data

US 2023/0004372 A1    Jan. 5, 2023

(51) Int. Cl.
*G06F 9/44*        (2018.01)
*G06F 8/65*        (2018.01)

(52) U.S. Cl.
CPC ........................................ *G06F 8/65* (2013.01)

(58) Field of Classification Search
CPC ........................................................ G06F 8/65
USPC ................................................ 717/168–178
See application file for complete search history.

(56) References Cited

U.S. PATENT DOCUMENTS

| 2009/0260004 | A1* | 10/2009 | Datta | G06F 8/65 |
| | | | | 717/175 |
| 2010/0131084 | A1* | 5/2010 | Van Camp | G06F 8/65 |
| | | | | 700/86 |

OTHER PUBLICATIONS

Daniel K. O'Reilly, Jr., et al., "Techniques for Command Execution Using a State Machine," U.S. Appl. No. 17/018,369, filed Sep. 11, 2020.

* cited by examiner

*Primary Examiner* — Chuck O Kendall
(74) *Attorney, Agent, or Firm* — Muirhead and Saturnelli, LLC

(57) ABSTRACT

Performing upgrades may include: receiving a package including upgrade types each identifying a different upgrade subcomponent of the package; receiving a metadata file describing the package; receiving selection information identifying one or more of the upgrade types of the metadata file, wherein the one or more upgrade types identified by the selection information denote one or more corresponding upgrade subcomponents of the package to be upgraded; and performing first processing that upgrades a system in accordance with the metadata file and the selection information. The metadata file may identify an order for installing upgrade subcomponents, which upgrade subcomponents may be installed in parallel, and dependencies between different upgrade subcomponents. Modules of a system may implement a multi-phase state machine. During installation of an upgrade subcomponent, the multiple phases may be completed in a specified order where code of the modules implementing each phase may be invoked.

16 Claims, 8 Drawing Sheets subcomponent: DP Compression
  metadata version: 1.0  ⎫
  version: M.L.K.N        ⎬ 252
  build version: 1.0.0.0  ⎭
  order_within_package: 4    254
  parallel_on_appliance_level: true    256
  parallel_supported_components: disk_firmware, language_pack    258
  dependencies: OE    260

META DATA DRIVEN UPGRADES

BACKGROUND

Technical Field

This application generally relates to upgrades that may be performed in one or more systems.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue PO operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for performing upgrades comprising: receiving a package including a plurality of upgrade types each identifying a different upgrade subcomponent of the package; receiving a metadata file describing the package; receiving selection information identifying one or more of the plurality of upgrade types of the metadata file, wherein the one or more upgrade types identified by the selection information denote one or more corresponding upgrade subcomponents of the package to be upgraded; and performing first processing that upgrades a system in accordance with the metadata file and the selection information. The first processing may include installing the one or more corresponding upgrade subcomponents of the package on the system.

In at least one embodiment, the selection information may identify at least two of the plurality of upgrade types having at least two corresponding upgrade subcomponents of the package. Processing may include determining, in accordance with the metadata file and the selection information, an order in which the at least two corresponding upgrade subcomponents of the package are installed on the system. The metadata file may include a plurality of metadata sections for the plurality of upgrade types, wherein each of the plurality of metadata sections ma include corresponding metadata for a different one of the plurality of upgrade types. The order in which the at least two corresponding upgrade subcomponents of the package are installed on the system may be determined in accordance with first metadata of at least two of the plurality of metadata sections describing the at least two upgrade types of the selection information.

In at least one embodiment, the at least two corresponding upgrade subcomponents of the package selected for installation may include a first upgrade subcomponent and a second upgrade subcomponent installed in parallel, and wherein two metadata sections of the metadata file indicate that it is allowable for the first upgrade subcomponent and a second upgrade subcomponent to be installed in parallel. The first upgrade subcomponent and the second upgrade subcomponent may be installed in parallel on the same node. The first upgrade subcomponent and the second upgrade subcomponent may be installed in parallel on two different nodes. A first upgrade type of the plurality of metadata types may be described by a first metadata section of the plurality of metadata sections, and wherein the first metadata section may indicate a dependency between the first upgrade type and a second upgrade type of the plurality of metadata types. The dependency may denote that a pair of upgrade subcomponents of the package corresponding to the first upgrade type and the second upgrade type are required to be installed when any one or more of the first upgrade type and the second upgrade type is selected for upgrade and installation.

In at least one embodiment, the first processing may include invoking a plurality of modules of the system to install the one or more corresponding upgrade subcomponents of the package on the system. For each of the one or more corresponding upgrade subcomponents installed, each of the plurality of modules may implement a state machine including a pre upgrade phase, a main upgrade phase and a post upgrade phase. For each corresponding upgrade subcomponent installed, the plurality of modules may include a first plurality of first code entities that performs pre upgrade phase processing, a second plurality of second code entities that performs main upgrade phase processing, and a third plurality of third code entities that performs post upgrade phase processing. Installing each corresponding upgrade subcomponent in the first processing may include invoking the first plurality of code entities of the plurality of modules to perform pre upgrade phase processing, invoking the second plurality of code entities of the plurality of modules to perform main upgrade phase processing, and invoking the third plurality of code entities of the plurality of modules to perform post upgrade phase processing. Execution of main upgrade phase may not start until the pre upgrade phase has completed, and wherein execution of the post upgrade phase may not start until the main upgrade phase has completed. All of the first plurality of code entities of the plurality of modules performing the pre upgrade phase processing may complete executing prior to commencing execution of any of the second plurality of code entities of the plurality of modules performing the main upgrade phase processing. All of the second plurality of code entities of the plurality of modules performing the main upgrade phase processing may complete executing prior to commencing execution of any of the third plurality of code entities of the plurality of modules performing the post upgrade phase processing.

Execution of main upgrade phase may not start until the pre upgrade phase has completed, and wherein execution of the post upgrade phase may not start until the main upgrade phase has completed. All of the first plurality of code entities of the plurality of modules performing the pre upgrade phase processing may complete executing prior to commencing execution of any of the second plurality of code entities of the plurality of modules performing the main upgrade phase processing. All of the second plurality of code entities of the plurality of modules performing the main upgrade phase processing may complete executing prior to commencing execution of any of the third plurality of code entities of the plurality of modules performing the post upgrade phase processing.

BRIEF DESCRIPTION OF THE DRAWINGS

Features and advantages of the present invention will become more apparent from the following detailed description of exemplary embodiments thereof taken in conjunction with the accompanying drawings in which:

FIGS. 3A and 3B are examples of metadata describing a package that may be used in an embodiment in accordance with the techniques herein.

DETAILED DESCRIPTION OF EMBODIMENT(S)

Figure 1:
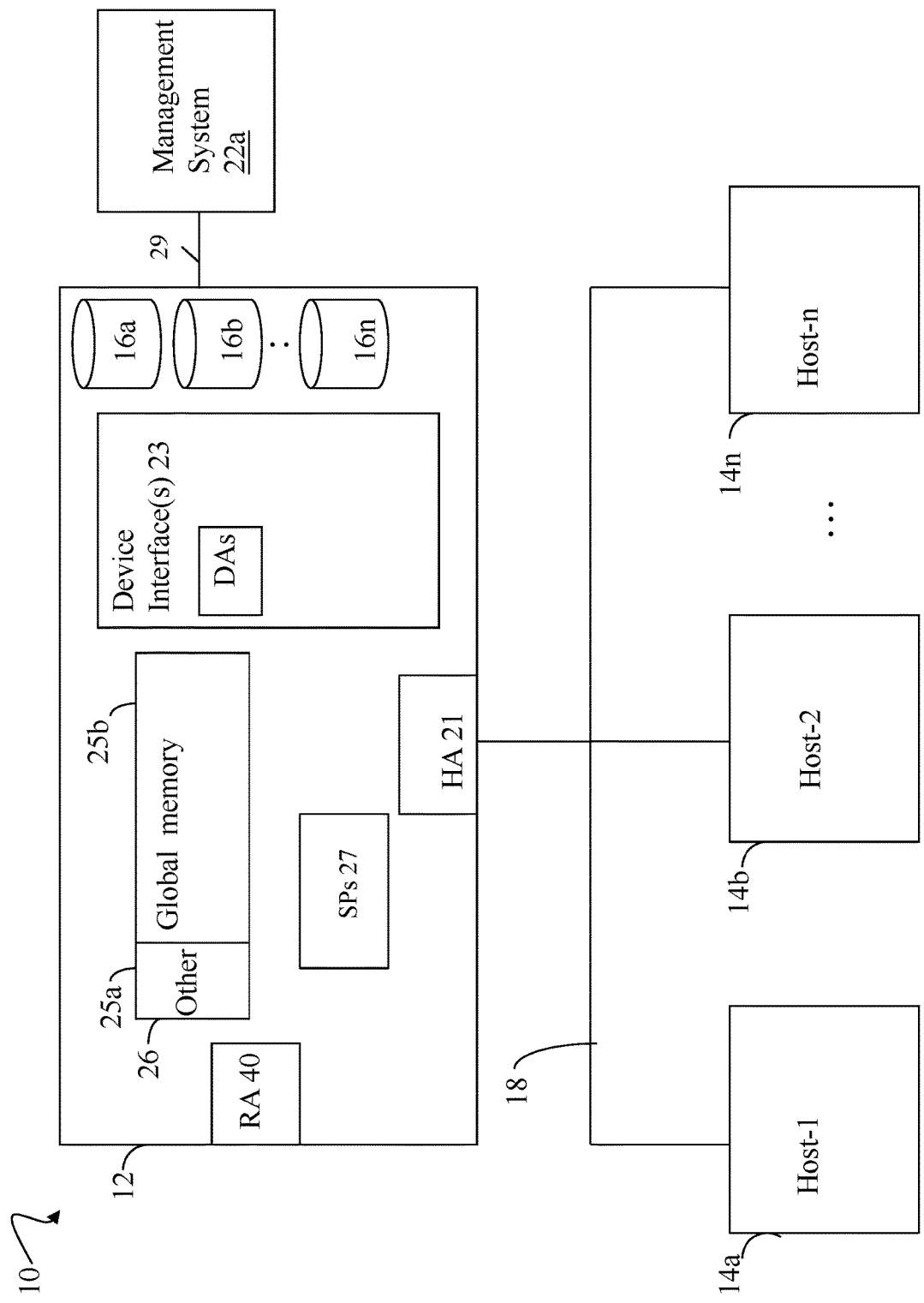
FIG. 1 is an example of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 may be connected to the communication medium 18 may pass through other communication devices, such as switching equipment, a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although the element 12 is illustrated as a single data storage system, such as a single data storage array, the element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of controllers, adapters or directors, such as an HA 21 (host adapter), RA 40 (remote adapter), and/or device interface(s) 23. Each of the adapters (sometimes also known as controllers, directors or interface components) may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage device interfaces 23 may include device interface modules, for example, one or more disk adapters (DAs) (e.g., disk controllers) for interfacing with the flash drives or other physical storage devices (e.g., PDS 16a-n). The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, the HAs and/or the RAs in a data storage array. In one embodiment, the device interfaces 23 may perform data operations using a system cache that may be included in the global memory 25b, for example, when communicating with other device interfaces and other components of the data storage array. The other portion 25a is that portion of the memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may include one or more type of device interface used in connection with facilitating data transfers to/from the associated disk drive(s) and LUN (s) residing thereon. For example, such device interfaces may include a device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Information regarding the data storage system configuration may be stored in any suitable data container, such as a database. The data storage system configuration information stored in the database may generally describe the various physical and logical entities in the current data storage system configuration. The data storage system configuration information may describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or data path may include commands that query or read selected portions of the data storage system configuration, such as information regarding the properties or attributes of one or more LUNs. The management commands may also include commands that write, update, or modify the data storage system configuration, such as, for example, to create or provision a new LUN (e.g., which may result in modifying one or more database tables such as to add information for the new LUN), to modify an existing replication schedule or configuration (e.g., which may result in updating existing information in one or more database tables for the current replication schedule or configuration), to delete a LUN (e.g., which may include deleting the LUN from a table of defined LUNs and may also include modifying one or more other database tables to delete any existing snapshots of the LUN being deleted), and the like.

It should be noted that each of the different controllers or adapters, such as each HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, the techniques herein may be used in connection with any suitable storage system, appliance, device, and the like, in which data is stored. For example, an embodiment may implement the techniques herein using a midrange data storage system, such as a Dell EMC Unity® data storage system or a Dell EMC PowerStore® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on the management system 22a to the data storage system 12. Such commands may be, for example, to establish or modify data services, provision storage, perform user account management, and the like. Consistent with other discussion herein, the management commands may result in processing that includes reading and/or modifying information in the database storing data storage system configuration information. For example, management commands that read and/or modify the data storage system configuration information in the database may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

Figure 2:
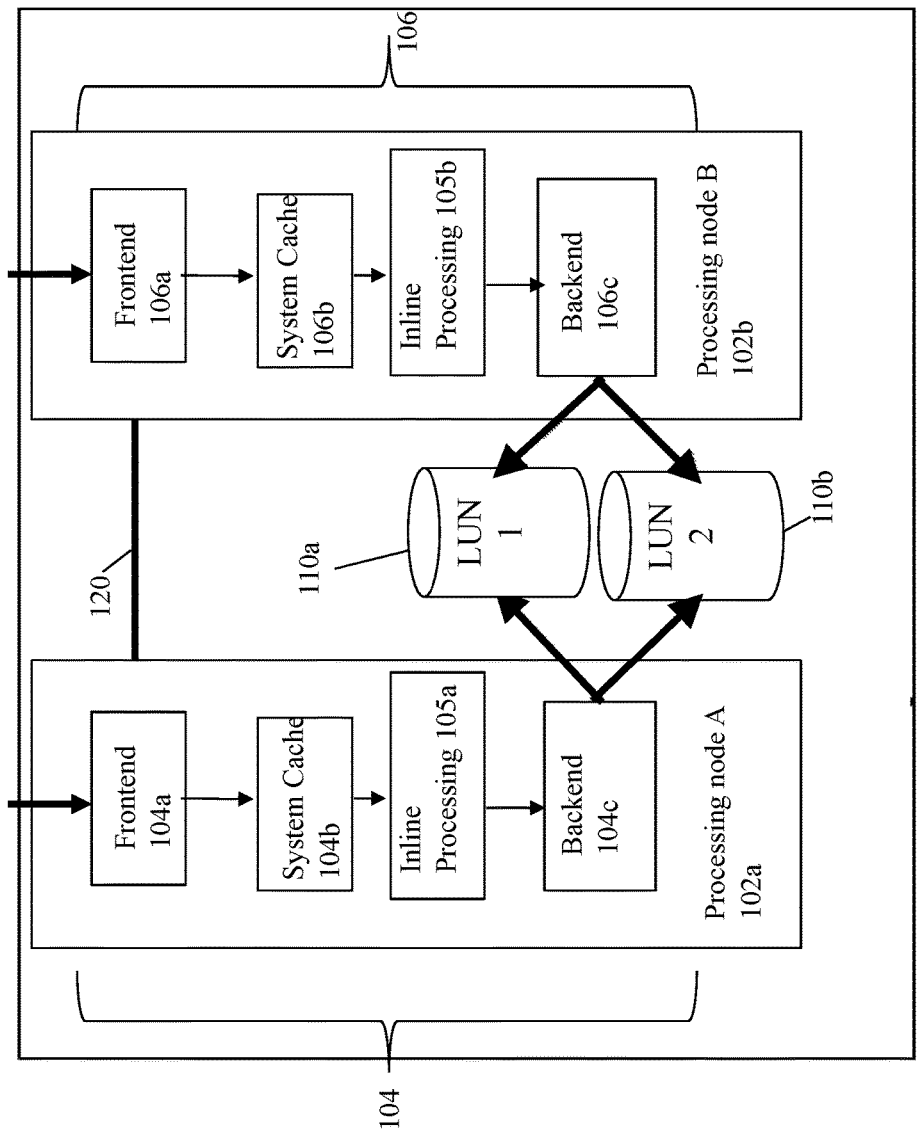
FIG. 2 is an example illustrating the PO path or data path in connection with processing data in an embodiment in accordance with the techniques herein.

With reference to the FIG. 2, shown is an example 100 illustrating components that may be included in the data path in at least one existing data storage system in accordance with the techniques herein. The example 100 includes two processing nodes A 102a and B 102b and the associated software stacks 104, 106 of the data path, where I/O requests may be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing may be performed by layer 105a. Such inline processing operations of 105a may be optionally performed and may include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include, for example, performing one or more data reduction operations such as data deduplication or data compression. The inline processing may include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O may be directed to a location or logical address of a LUN and where data may be read from, or written to, the logical address. The LUNs 110a, 110b are examples of storage objects representing logical storage entities included in an existing data storage system configuration. Since, in this example, writes directed to the LUNs 110a, 110b may be received for processing by either of the nodes 102a and 102b, the example 100 illustrates what may also be referred to as an active-active configuration.

In connection with a write operation as may be received from a host and processed by the processing node A 102a, the write data may be written to the system cache 104b, marked as write pending (WP) denoting it needs to be written to the physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component 104a). At various points in time, the WP data stored in the system cache is flushed or written out to the physical storage 110a, 110b.

In connection with the inline processing layer 105a, prior to storing the original data on the physical storage 110a, 110b, one or more data reduction operations may be performed. For example, the inline processing may include performing data compression processing, data deduplication processing, and the like, that may convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b may be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 may be used for internode communication between the nodes 102a, 102b.

In connection with at least one embodiment in accordance with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage such as BE PDs providing non-volatile storage. For example, in at least one embodiment, a RAM based memory may be one of the caching layers used as to cache the write data that is then flushed to the backend physical storage. When the processor performs processing, such as in connection with the inline processing 105a, 105b as noted above, data may be loaded from the main memory and/or other lower cache levels into its CPU cache.

In at least one embodiment, the data storage system may be configured to include one or more pairs of nodes, where each pair of nodes may be generally as described and represented as the nodes 102a-b in the FIG. 2. For example, a data storage system may be configured to include at least one pair of nodes and at most a maximum number of node pairs, such as for example, a maximum of 4 node pairs. The maximum number of node pairs may vary with embodiment. In at least one embodiment, a base enclosure may include the minimum single pair of nodes and up to a specified maximum number of PDs (sometimes referred to as BE PDs providing BE non-volatile storage that stores, for example, user or client data). In some embodiments, a single base enclosure may be scaled up to have additional BE non-volatile storage using one or more expansion enclosures, where each expansion enclosure may include a number of additional PDs. Further, in some embodiments, multiple base enclosures may be grouped together in a load-balancing storage cluster or federation to provide up to the maximum number of node pairs. Consistent with other discussion herein, each node may include one or more processors and memory. In at least one embodiment, each node may include two multi-core processors with each processor of the node having a core count of between 8 and 28 cores. In at least one embodiment, the PDs may all be non-volatile SSDs, such as flash-based storage devices and storage class memory (SCM) devices. It should be noted that the two nodes configured as a pair may also sometimes be referred to as peer nodes. For example, the node A 102a is the peer node of the node B 102b, and the node B 102b is the peer node of the node A 102a.

In at least one embodiment, the data storage system may be configured to provide both block and file storage services with a system software stack that includes an operating system running directly on the processors of the nodes of the system.

In at least one embodiment, the data storage system may be configured to provide block-only storage services (e.g., no file storage services). A hypervisor may be installed on each of the nodes to provide a virtualized environment of virtual machines (VMs). The system software stack may execute in the virtualized environment deployed on the hypervisor. The system software stack (sometimes referred to as the software stack or stack) may include an operating system running in the context of a VM of the virtualized environment. Additional software components may be included in the system software stack and may also execute in the context of a VM of the virtualized environment.

In at least one embodiment, each pair of nodes may be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes may not be shared with other pairs of nodes. A host may access data stored on a BE PD through the node pair associated with or attached to the PD.

In at least one embodiment, each pair of nodes provides a dual node architecture where both nodes of the pair may be identical in terms of hardware and software for redundancy and high availability. Consistent with other discussion herein, each node of a pair may perform processing of the different components (e.g., FA, DA, and the like) in the data path or I/O path as well as the control or management path. Thus, in such an embodiment, different components, such as the FA, DA and the like of FIG. 1, may denote logical or functional components implemented by code executing on the one or more processors of each node. Each node of the pair may include its own resources such as its own local (i.e., used only by the node) resources such as local processor(s), local memory, and the like.

In systems, such as data storage systems, upgrades or updates may be performed periodically. In some systems, the upgrade may be a non-disruptive upgrade (NDU) that may be characterized as non-disruptive from the perspective of an external host or other external client. With an NDU, for example, the host may continue to send I/Os that are serviced during the NDU process. In complex distributed systems and storage clusters that may include multiple appliances or systems, there is a need to perform NDUs that may vary in complexity. For example, the NDU may deliver a new software version for a major upgrade or release, where such an upgrade may be complex affecting many components or modules of the data storage system. At other times, NDUs performed may be less complex affecting fewer components or modules of the system. For example, an NDU may be performed to install an upgrade or enhancement for firmware, a localization pack, a hot fix or patch, an operating system update, and the like.

In at least one existing system, handling multiple types of upgrades may result in developing new code to handle every upgrade type across relevant modules or components of the system. For such systems, a significant amount of time may be consumed in performing the necessary integration and testing of the upgrade process or procedure.

In order to reduce the overhead of developing the code handling every new upgrade type across all relevant modules and investing time in end-to-end integration and testing, described in the following paragraphs are techniques that utilize a metadata driven approach in connection with performing upgrades. In at least one embodiment, the techniques described in the following paragraphs generalize the process or workflow performed for the different types of supported software upgrades. Additionally, such techniques minimize the user interaction and input needed to proceed with the upgrade procedure. The techniques described herein reduce the overhead and knowledge required by the user to perform the upgrade and increase automation of the upgrade procedure in contrast to one or more existing upgrade procedures.

In at least one embodiment, an upgrade to be installed may be referred to herein as a package file. In at least one embodiment, the package file may be an image file including the contents used for the upgrade. The package file may have a predefined format or layout and may include one or more of, for example, command files or scripts, metadata files, and code to be installed as part of the upgrade.

In at least one embodiment, the package file may include, or be accompanied by, a metadata file that generally describes the current upgrade(s) available in the package file. In at least one embodiment, the metadata file may be a JSON (JavaScript Object Notation) file. A JSON file may be characterized as a file that stores data structures and objects in accordance with the JSON format, which is an open standard file format and data interchange format that uses human-readable text to store and transmit data objects consisting of attribute—value pairs and arrays.

In at least one embodiment, different package types may be specified, where each such package type may denote a type of supported upgrade. For example, in at least one embodiment, supported package types may include a disk firmware upgrade, a localization pack upgrade, and a major release upgrade. In at least one embodiment, the disk firmware may upgrade firmware used in connection with data storage devices such as the BE PDs. In at least one embodiment, a disk firmware upgrade may include upgrading the firmware of one or more BE PDs accessed by a data storage system or appliance.

A localization pack upgrade may be a localization with respect to a particular supported language pack. In at least one embodiment, multiple language packs may be supported, where each language pack refers to a particular supported language variation such as, for example, Chinese, English, French, or Spanish. For example, a language pack upgrade for Chinese may upgrade a GUI of a management application used to manage a data storage system. Thus the particulars of the upgrade for a language pack may vary with the particular language customizations selected for an existing installation or system. The selected language may denote the native language used in connection with various UI aspects of the system and installation.

A major release upgrade may generally affect multiple or all components or modules of the system. A major release upgrade may include, for example, software patches or fixes that may be applied dynamically while the system is running without rebooting or restarting the system to implement the corrections or changes of the fix or patch; and/or an operating system upgrade.

In at least one embodiment in accordance with the techniques herein, the metadata file for an upgrade may identify one or more package types or upgrade types included in the package file for the upgrade.

In at least one embodiment in accordance with the techniques herein, the metadata file may include information that defines the ordering in which multiple types of upgrades of the same package may be installed.

In at least one embodiment in accordance with the techniques herein, the metadata file may include information identifying which types of upgrades may be performed in parallel on nodes of the same data storage system or appliance, or in parallel on multiple appliances or systems operating collectively as a single storage cluster or federation.

In at least one embodiment in accordance with the techniques herein, the metadata file may identify any dependencies among multiple types of upgrades included in the same package.

In at least one embodiment in accordance with the techniques herein, an existing system may have multiple components or modules that perform processing in connection with the upgrade.

In at least one embodiment in accordance with the techniques herein, each of multiple components or modules of the system may implement a state machine that uses generic phases to manage the single component upgrade, invoke other depending components, and aggregate responses to report back using unified APIs. In at least one embodiment, the state machine for a single component or module used in connection with the upgrade may include 3 phases or states: a pre-upgrade phase, a main upgrade phase and a post-upgrade phase. Each of the phases of the state machine may be implemented using one or more processes, threads, routines or other code entities. The pre-upgrade phase may be called or invoked prior to the start of the actual upgrade to allow modules or components of the system to prepare for the upgrade. The main upgrade phase may perform the actual upgrade. The post-upgrade phase may be called or invoked after the actual upgrade of the one or more components or modules of the system have been upgraded by the main upgrade phase. The post-upgrade phase may be performed to allow components or modules to perform any needed post upgrade processing such as, for example, cleanup or other processing needed. In at least one embodiment, the three phases may be performed in sequential order for an upgrade type or package type, where performing the pre-upgrade phase for one upgrade type or package type may include performing pre-upgrade phase processing for all one or more components of the system to be upgraded. Following performing the pre-upgrade phase for all one or more components to be upgraded, the main upgrade phase for all one or more components to be upgraded is performed. Following the main upgrade phase for all one or more components that are upgraded, the post-upgrade phase is then performed for all one or more components that were upgraded in the prior main upgrade phase.

In at least one embodiment, a component or module of the system may define callbacks for the different phases or states of the state machine. The callbacks may be, for example, routines or bodies of code associated with hooks or code entry points. The upgrade process or procedure workflow may then invoke the particular callbacks of the components or modules when performing the different phases for a particular upgrade type, package type or package subcomponent. The callbacks may be in accordance with a defined call interface or API. For example, component A and B may be two components in the system to be upgraded for a first package subcomponent, package type or upgrade type. The component A may define a pre-upgrade phase code entity A1 that is invoked when performing the pre-upgrade phase. The component B may define a pre-upgrade phase code entity B1 that is invoked when performing the pre-upgrade phase. The component A may define a main upgrade phase code entity A2 that is invoked when performing the main upgrade phase. The component B may define a main upgrade phase code entity B2 that is invoked when performing the main upgrade phase. The component t A may define a post-upgrade phase code entity A3 that is invoked when performing the post-upgrade phase. The component B may define a post-upgrade phase code entity B3 that is invoked when performing the post-upgrade phase.

In at least one embodiment, various tasks or processing performed in connection with an upgrade may be partitioned among the various modules or components of the system. Various tasks or processing performed in connection with different upgrade types or package types may be partitioned among different modules or components of the system, where such different modules or components include code for performing specified tasks or processing in connection with the different upgrade types or package types. Performing an upgrade of a single upgrade type or package type may be implemented by one or more of the various modules or components. In at least one embodiment, a system management (SYM) component may be responsible for orchestrating processing performed for an upgrade type or package type among multiple other modules or components. For an upgrade being performed for a particular package type or upgrade type, the SYM module may, for example, coordinate and initiate processing of the various upgrade phases among other modules of the system implementing the upgrade. The SYM module may, for example, initiate processing of the pre upgrade phase among the other modules and ensure that the pre upgrade phase processing of all such other modules has completed before commencing with the next main upgrade phase. The SYM module may, for example, initiate processing of the main upgrade phase among the other modules and ensure that the main upgrade phase processing of all such other modules has completed before commencing with the next post upgrade phase. In at least one embodiment, the control path (CP) module of the system may initiate a session for each upgrade type or package type. One or more modules, such as the CP module and/or the SYM module, may use the metadata file to determine which upgrades for the different upgrade types or package types may be performed in parallel such as, for example, in parallel on two nodes of the same appliance or cluster, or on parallel on multiple CPUs or cores of the same node. In at least one embodiment, the module, such as the CP module, may coordinate and initiate any parallel processing performed one or more upgrade types or package types.

In at least one embodiment, for a new package type identifying a new upgrade type, a corresponding new metadata section may be added to the metadata file. In at least one embodiment, an existing package type may be easily removed or no longer supported, where the corresponding metadata files may be modified to remove the corresponding metadata section for the removed package type. Support to add a new upgrade type or package type may include adding one or more additional modules or components to the system to perform the necessary tasks to implement an upgrade of the new type. Adding a new or additional component or module to the system may include adding callbacks or routines in accordance with a defined API, where such routines are invoked in their respective phases of the upgrade process or workflow based on the state machine implemented by each module or component of the system. Support to add a new upgrade type or package type may include modifying one or more existing modules or components to the system to perform the necessary tasks to implement an upgrade of the new type. Modifying an existing component or module of the system to support a new upgrade type or package type may include adding callbacks or routines to the existing component in accordance with a defined API, where such routines are invoked in their respective phases of the upgrade process or workflow based on the state machine implemented by each module or component of the system.

The foregoing and other aspects of the techniques described herein are described in more detail in the following paragraphs.

In the following paragraphs, reference is made to a dual node storage appliance or system including particular components or modules. More generally, the techniques herein may be used with any suitable system having any number of components or modules that may be used in connection with an upgrade. Additionally, the following paragraphs reference a particular metadata file and format for illustrative purposes. More generally, the metadata file and format may support any number and type of upgrades or packages, and may support any suitable upgrade option that may be included in an embodiment.

Figure 3A:
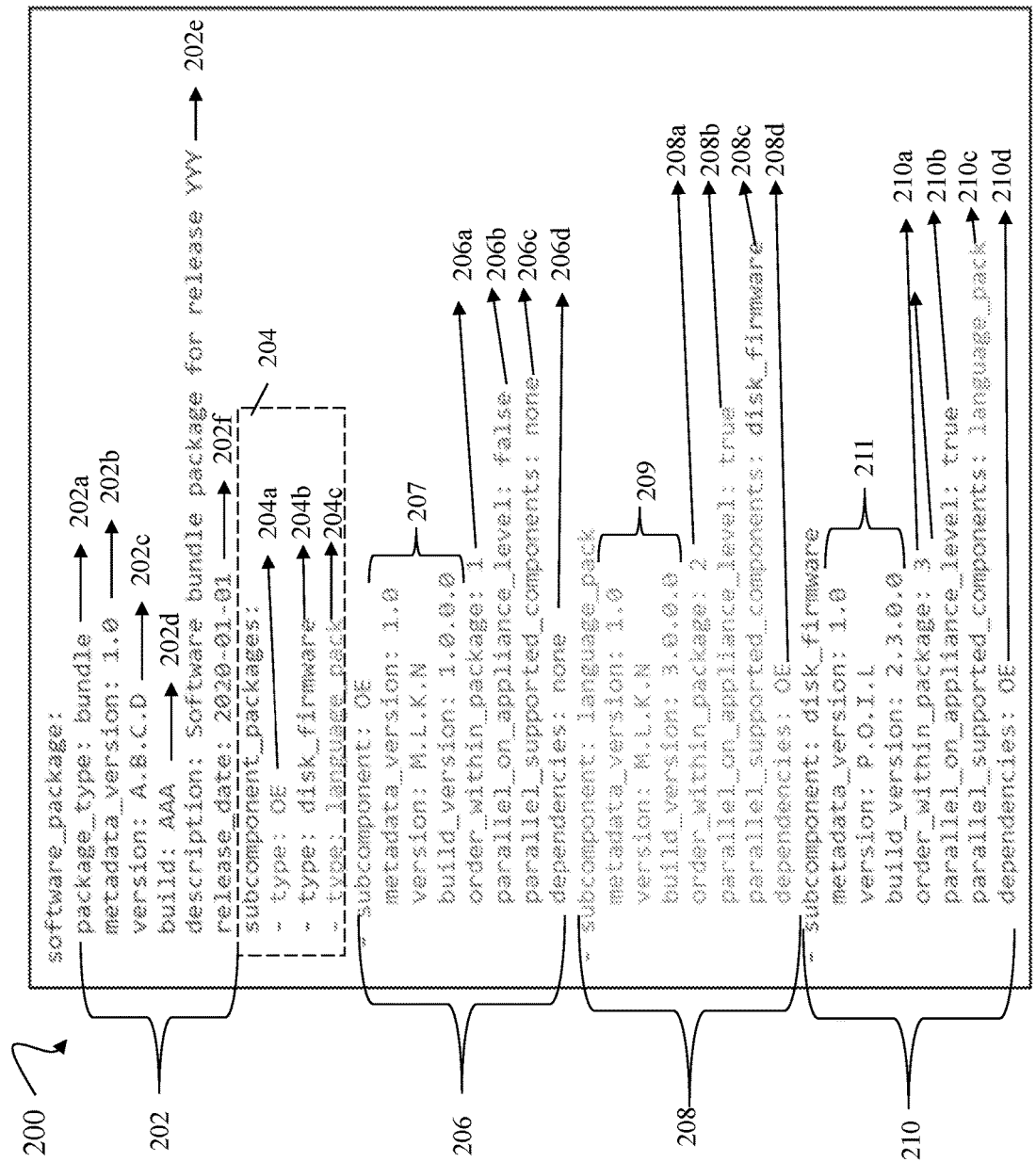

Referring to FIG. 3A, shown is an example 200 of a metadata file that may be included in a package and used in connection with performing an upgrade in an embodiment in accordance with the techniques herein.

In at least one embodiment as illustrated in the example 200, the metadata file for the upgrade may generally describe a corresponding package and may be implemented as a JSON file. The metadata file may vary with each corresponding package. As discussed elsewhere herein in at least one embodiment, a package may generally be characterized as an image file including the content for an upgrade. Generally, the package may include files and information for one or more types of upgrades described by the metadata file corresponding to the upgrade package.

The example 200 includes a header section 202 with metadata about the package. In this example, the section 202 may include line 202a identifying the package as bundled including multiple types of upgrades. Generally, the line 202a may be characterized as an indicator denoting whether the package includes multiple types of upgrades. The indicator may, for example, be bundled as in the line 202a if the package includes multiple types of upgrades. Otherwise, the indicator 202a may include another value, such as single or non-bundled, denoting the package includes only a single type of upgrade. The remaining lines of the section 202 may include further metadata describing the metadata file and also the particular package associated with, or described by, the metadata file 200. For example, the line 202b of the section 202 may identify the version of the metadata file 200. In at least one embodiment the format or supported fields may vary so the line 202b may correspond to a particular version of the metadata file, where the version of the metadata file may vary with the format or layout of the metadata file, may vary with the supported fields, and/or may vary with the supported upgrade types or package types allowable and recognized in the section 204 discussed below. The lines 202c-d may, respectively, identify the upgrade version and build. The line 202e may provide a human readable description of the upgrades of the package described by the metadata file 200. The line 202f may specify the release date of the upgrades and package described by the metadata file 200.

Following the header section 202 is a section 204 identifying the multiple package types or upgrade types included in the package described by the metadata file 200. In one aspect, the section 204 may be characterized as identifying the multiple subcomponent packages of the package described by the metadata file 200. The section 204 indicates that the package includes upgrades for the following 3 package subcomponents, package types or upgrade types: OE 204a denoting a major upgrade to multiple or all components of the system, disk firmware 204b denoting an upgrade to the data storage device firmware (e.g., firmware for the BE PDs), and language pack 204c denoting an upgrade to one or more language packs (e.g., where the particulars of the upgrade may vary with the particular language selected for an existing installation or system. The selected language may denote the native language used in connection with various UI aspects of the installation). The OE 204a denoting a major upgrade may include, for example, one or more of the following: an operating system upgrade, an upgrade or update to the GUI of the management application used to manage the data storage system, a hot fix or patch, bug fixes, an upgrade to the data path, an upgrade to the control path, and the like.

In this example, the section 204 may be parsed to identify the package types or upgrade types included in the single package described by the metadata file of FIG. 3A. In at least one embodiment, the information of the section 204 may be displayed and presented to a user performing the upgrade, where the user may then select to perform one or more of the listed upgrade types. Subsequent information in the metadata file 200 may include a different section for each of the package or upgrade types listed in the section 204. For example, the sections 206, 208 and 210 describe further metadata particular to the different package or upgrade types of the section 204.

In the example 200, the section 206 describes the OE package type or upgrade type, the section 208 describes the language pack package type or upgrade type, and section 210 describes the disk firmware package type or upgrade type. Each of the sections 206, 208 and 210 described in more detail below may generally include metadata describing a corresponding package type or upgrade type. In at least one embodiment, the sections 206, 208 and 210 describing different package types or upgrade types may each include, for example, version information, the relative installation ordering of the package subcomponents or package types, whether the corresponding package type or upgrade type may be performed in parallel when installing other package types or upgrade types, what one or more other package types or upgrade types may be performed in parallel, and identify any package type or upgrade type dependencies among the package subcomponents of the package.

The OE package type metadata section 206 may include the lines 207 describing the metadata version, the software version, and the build version for the OE upgrade of the package. The OE package type metadata section 206 may include the line 206a denoting the order in which this particular upgrade type or package subcomponent OE may be installed relative to other package subcomponents or upgrade types of the package. The line 206a has a value of one (1) and indicates that the OE package type may be installed first in a defined sequence of upgrades with respect to all package subcomponents or upgrade types of the package. The line 206b has a value of false and indicates that the OE package type or upgrade may not be upgraded in parallel on nodes of the same appliance or across multiple appliances that may configured in a storage cluster or federation. In at least one embodiment with a dual node appliance, the line 206b having a value of false may mean that the OE package type or upgrade may not be performed in parallel on both nodes of the appliance. Additionally, in at least one embodiment with a dual node appliance, the line 206b having a value of false may mean that the OE package type or upgrade may not be performed on a first node in parallel while any other upgrade type is performed on the second node of the appliance. The line 206c has a value of none and indicates that no other subcomponent package or upgrade type may be installed in parallel with the OE package type, upgrade type or subcomponent package. The line 206d has a value of none indicating that there are no dependencies between the OE package type and the two remaining package types, upgrade types or subcomponents of the package described by the file 200.

The language pack package type metadata section 208 may include the lines 209 describing the metadata version, the software version, and the build version for the language pack upgrade of the package. The language pack package type metadata section 208 may include the line 208a denoting the order in which this particular upgrade type or package subcomponent language pack may be installed relative to other package subcomponents or upgrade types of the package. The line 208a has a value of two (2) and indicates that the language pack package type is installed second in the defined sequence of upgrades with respect to all package subcomponents or upgrade types of the package. The line 208b has a value of true and indicates that the language pack package type or upgrade may be installed in parallel on nodes of the same appliance or across multiple appliances that may configured in a storage cluster or federation. The line 208c has a value of disk firmware and indicates that the disk firmware subcomponent package or upgrade type may be installed in parallel with the language pack package type, upgrade type or subcomponent package. The line 208d has a value of OE identifying one of the defined package types or upgrade types indicating that there is a dependency between the language pack package type, upgrade type or subcomponent and the OE package type, upgrade type or subcomponent of the package described by the file 200. Generally, the line 208d identifies the one or more other package types, upgrade types of package subcomponents, if any, that are also required to be installed along with the language pack package type, upgrade type or package subcomponent. In other words, if the user selects to install the language pack package type, upgrade type or subcomponent package, the OE package type, upgrade type or subcomponent package is also required to be installed.

The disk firmware package type metadata section 210 may include the lines 211 describing the metadata version, the software version, and the build version for the disk firmware package type or upgrade of the package. The disk firmware package type metadata section 210 may include the line 210a denoting the order in which this particular upgrade type or package subcomponent language pack may be installed relative to other package subcomponents or upgrade types of the package. The line 210a has a value of three (3) and indicates that the language pack package type is installed third in the defined sequence of upgrades with respect to all 3 package subcomponents or upgrade types of the package. The line 210b has a value of true and indicates that the disk firmware package type or upgrade may be installed in parallel on BE PDs of the same appliance or across multiple appliances that may configured in a storage cluster or federation. The line 210c has a value of language pack and indicates that the language pack subcomponent package or upgrade type may be installed in parallel with the disk firmware package type, upgrade type or subcomponent package. The line 210d has a value of OE identifying one of the defined package types or upgrade types indicating that there is a dependency between the disk firmware package type, upgrade type or subcomponent and the OE package type, upgrade type or subcomponent of the package described by the file 200. Generally, the line 210d identifies the one or more other package types, upgrade types of package subcomponents, if any, that are also required to be installed along with the language pack package type, upgrade type or package subcomponent. In other words, if the user selects to install the disk firmware package type, upgrade type or subcomponent package, the OE package type, upgrade type or subcomponent package is also required to be installed.

In at least one embodiment, the information of the metadata file 200 may be read and parsed. A user may be presented, such as via a GUI, with a list of the 3 package types, upgrade types or package subcomponents denoted by the section 204. A user may then make a selection regarding what one or more of the 3 package types, upgrade types or package subcomponents denoted by the section 204 are to be installed. As a first scenario, a user may select to install all 3 package types, upgrade types or package subcomponents denoted by the section 204. In this case, the fields 206a, 208a and 210a are used to define the order in which the different upgrades denoted by the 3 types are installed on the system. Based on the example 200, the 3 package types, upgrade types or package subcomponents denoted by the section 204 may be installed in the following sequence or order: OE upgrade, language pack upgrade, and disk firmware upgrade. In a dual node appliance, for example, the foregoing order or sequence may be performed to upgrade software on each node of the appliance. Based on the metadata file 200, the OE upgrade may not be performed in parallel with any other upgrade type on each of the nodes. However, the disk firmware upgrade to the BE PDs of the appliance and the language pack upgrade to a node of the appliance may be performed in parallel. For example, supported parallel upgrades on the dual node appliance may include installing the disk firmware on a BE PD of the appliance while also installing in parallel the language pack upgrade on one or both of the nodes of the appliance.

In at least one embodiment in which multiple appliances are configured in the same storage cluster, based on the example 200, the OE upgrade may not be performed in parallel on any of the nodes of the storage cluster. However, the disk firmware upgrade and the language pack upgrades may be performed in parallel within the cluster. For example, supported parallel upgrades in the storage cluster may include installing the disk firmware on BE PDs of one appliance of the cluster while also installing in parallel the language pack upgrade on one or more nodes of one or more appliances of the cluster.

As noted above, the fields 206a, 208a and 210a denote a relative ordering in which the corresponding package types or upgrades may be performed. In at least one embodiment, a user may also select in a second scenario to install less than all 3 of the package types or upgrades of the section 204. For example, a user may select to install the OE upgrade and the disk firmware upgrade and omit installing an applicable language pack upgrade. In this case, the fields 206a and 210a define the relative order in which the corresponding package types or upgrades are installed. In this case for a dual node appliance, the OE upgrade to both nodes of an appliance may be performed prior to the disk firmware upgrade BE PDs of the appliance. As another example, a user may select to install the OE upgrade and the language pack upgrade and omit installing a disk firmware upgrade. In this case, the fields 206a and 208a define the relative order in which the corresponding package types or upgrades are installed. In this case, a first node of the appliance may be upgraded to first apply the OE upgrade and then the language pack upgrade.

In at least one embodiment, processing may be performed using the contents of the metadata file to validate the user upgrade selections. For example, if the user selects to install only the language pack upgrade type or only the disk firmware upgrade type, processing may be performed using the contents of the metadata file to validate the user upgrade selections. In this case, the user select is determined as invalid or inconsistent with allowable options of the metadata file since the metadata file indicates (e.g., via line 210d dependencies) that the OE upgrade type must be installed along with the disk firmware upgrade type, and also indicates e.g., via lines 208d dependencies) that the OE upgrade type must be installed along with the language pack upgrade type. The user may be requested to make a different valid selection of upgrade(s) to be installed consistent with the metadata file.

In at least one embodiment, the metadata file 200 may also include other fields not illustrated to specify other options. For example, in at least one embodiment, the metadata sections 206, 208 and 210 for the package types, upgrade types or package subcomponents may indicate whether or not to proceed with subsequent upgrades or installations of remaining subsequent package types, upgrade types or package subcomponents if upgrade or installation fails for one of the package types, upgrade types or package subcomponents. For example, an indicator may be specified in another field of the section 208 indicating whether or not to proceed with subsequent installation of the disk firmware upgrade to a node if installation of the language pack for the same node fails.

Referring to FIG. 3B, shown is another example of metadata that may be added to the file 200 of FIG. 3A in an embodiment in accordance with the techniques herein. Consider further another example of an upgrade type or package type that may be used in connection with compression processing. Assume that a new compression algorithm is to be installed and included in the data path as part of an upgrade. What will now be described are changes that may be made to the metadata file of FIG. 3A for this new additional upgrade type or package type. An embodiment may define a new package type or upgrade type, such as "DP Compression" and add the new package type or upgrade type to the section 204 of FIG. 3. Additionally, a new metadata section for DP Compression package type may be added to the metadata file of FIG. 3A. For example, assume the metadata section 250 for DP compression as illustrated in the FIG. 3B is added to the end of the metadata file following the section 210.

The example 250 specifies the DP compression package type metadata section that may include the lines 252 describing the metadata version, the software version, and the build version for the DP compression package type or upgrade of the package. The DP compression package type metadata section 250 may include the line 254 denoting the order in which this particular upgrade type or package subcomponent may be installed relative to other package subcomponents or upgrade types of the package. The line 254 has a value of four (4) and indicates that the DP compression package type is installed fourth in the defined sequence of upgrades with respect to all package subcomponents or upgrade types of the package. The line 256 has a value of true and indicates that the DP compression package type or upgrade may be installed in parallel on nodes of the same appliance or across multiple appliances that may configured in a storage cluster or federation. The line 258 denotes both the language pack and the disk firmware package types indicating that either or both of these subcomponent packages or upgrade types may be installed in parallel with the DP compression package type, upgrade type or subcomponent package. The line 260 has a value of OE identifying one of the defined package types or upgrade types indicating that there is a dependency between the DP compression package type, upgrade type or subcomponent and the OE package type, upgrade type or subcomponent of the package described by the file 200. Generally, the line 260 identifies the one or more other package types, upgrade types of package subcomponents, if any, that are also required to be installed along with the language pack package type, upgrade type or package subcomponent. In other words, if the user selects to install the DP compression package type, upgrade type or subcomponent package, the OE package type, upgrade type or subcomponent package is also required to be installed.

Referring to FIGS. 4, 5, 6 and 7, shown are flow diagrams illustrating processing that may be performed in an embodiment in accordance with the techniques herein.

Figure 4:
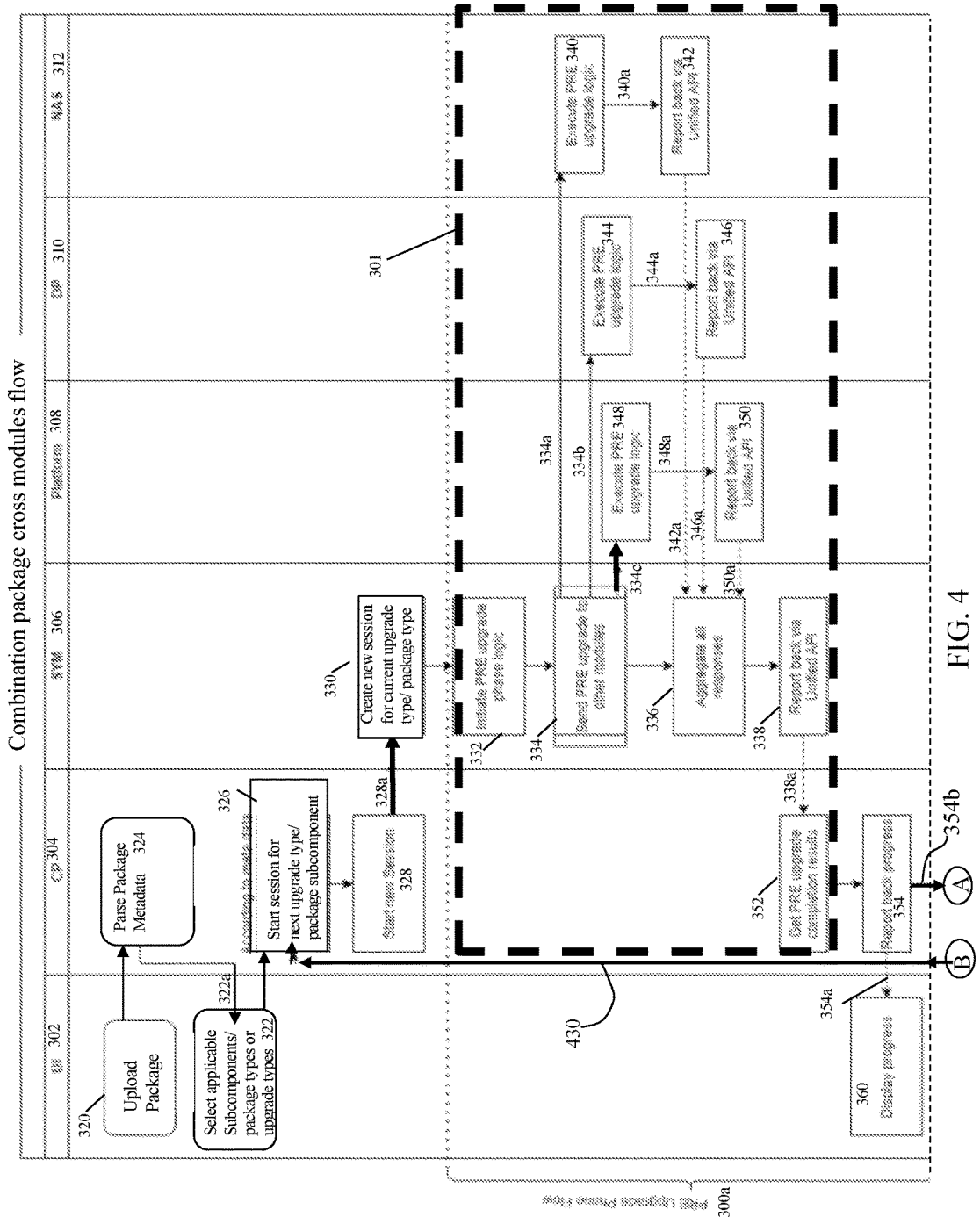
FIGS. 4, 5, 6 and 7 are flow diagrams of processing that may be performed in an embodiment in accordance with the techniques herein.
Figure 5:
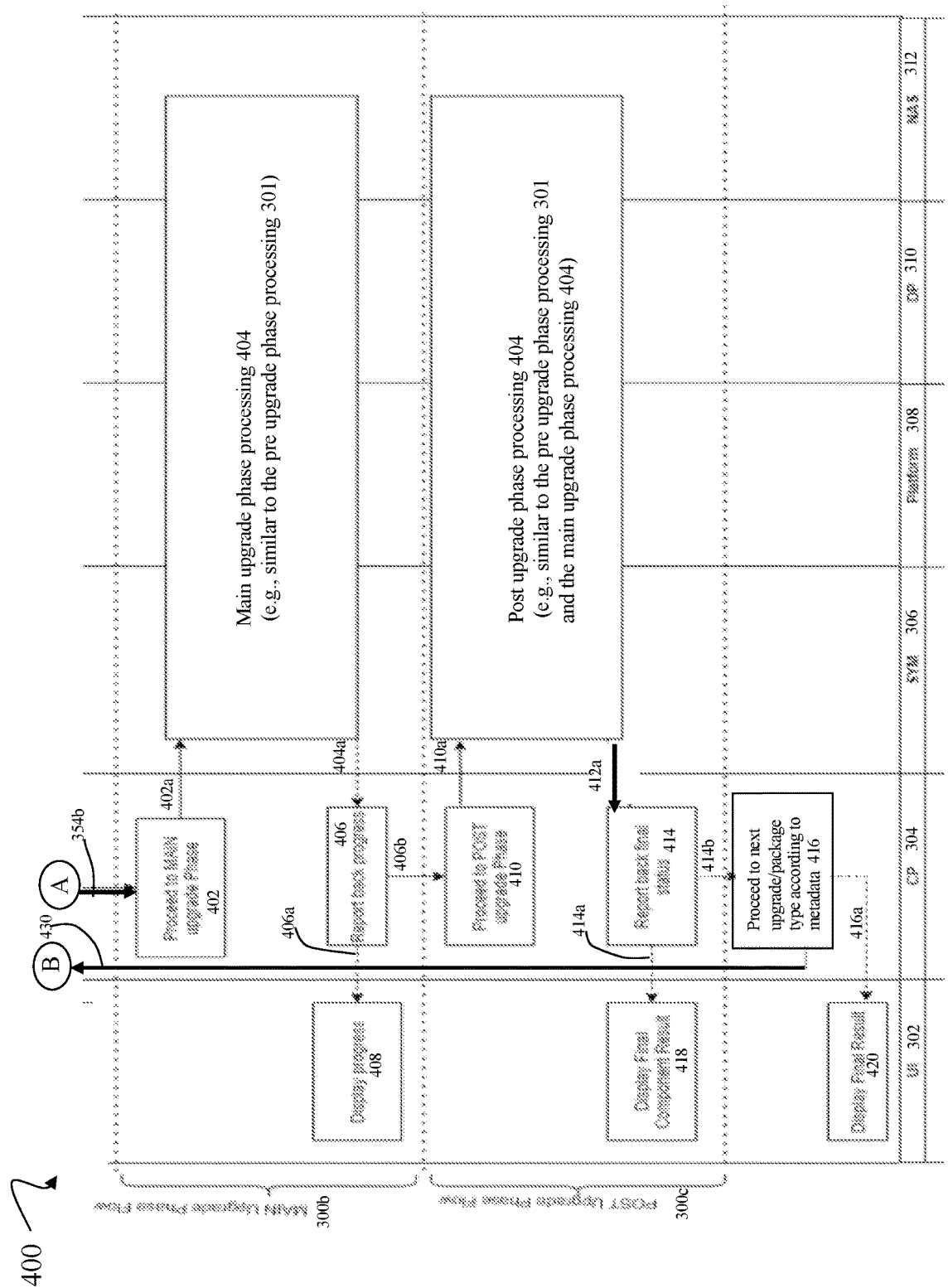
Figure 6:
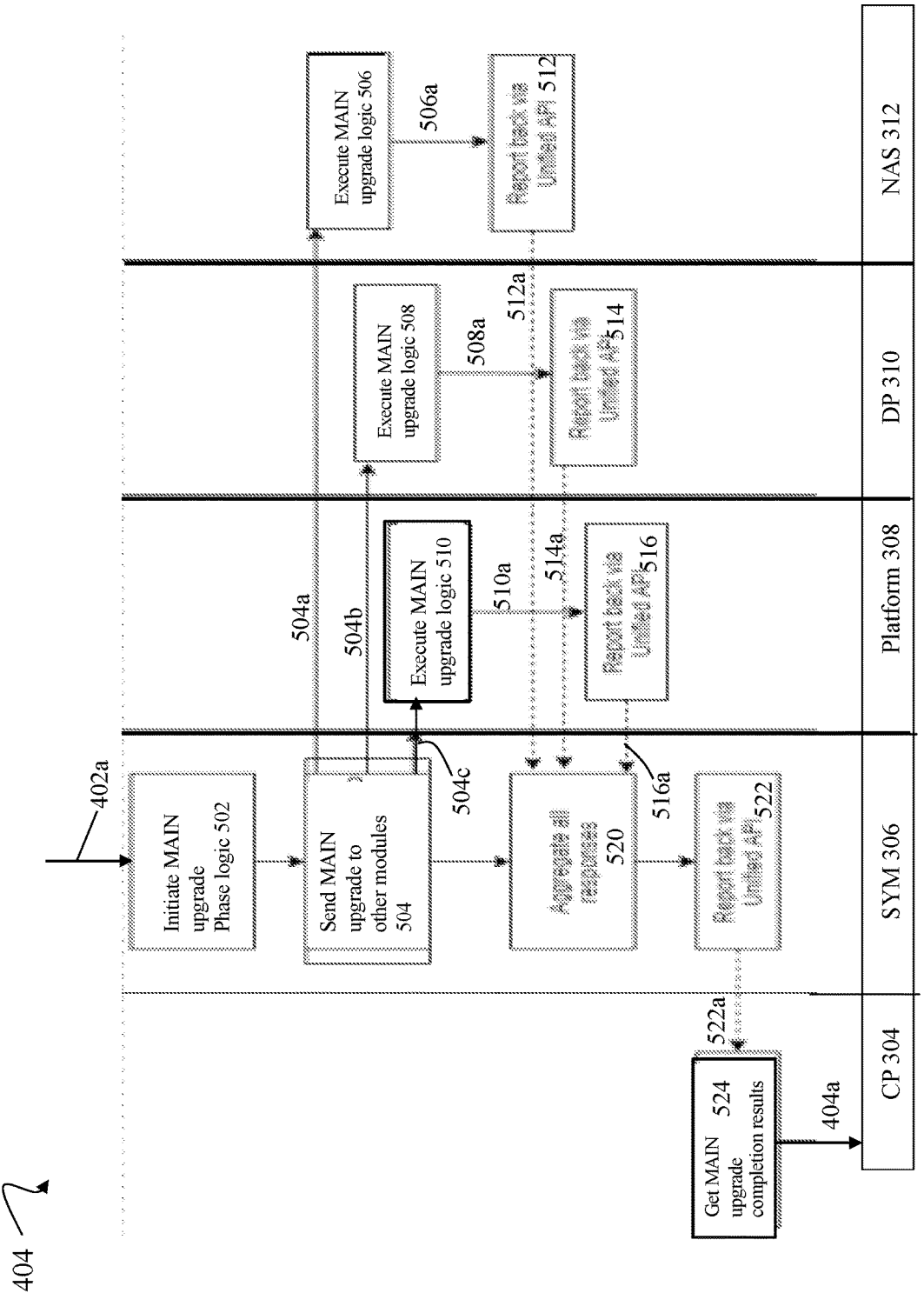
Figure 7:
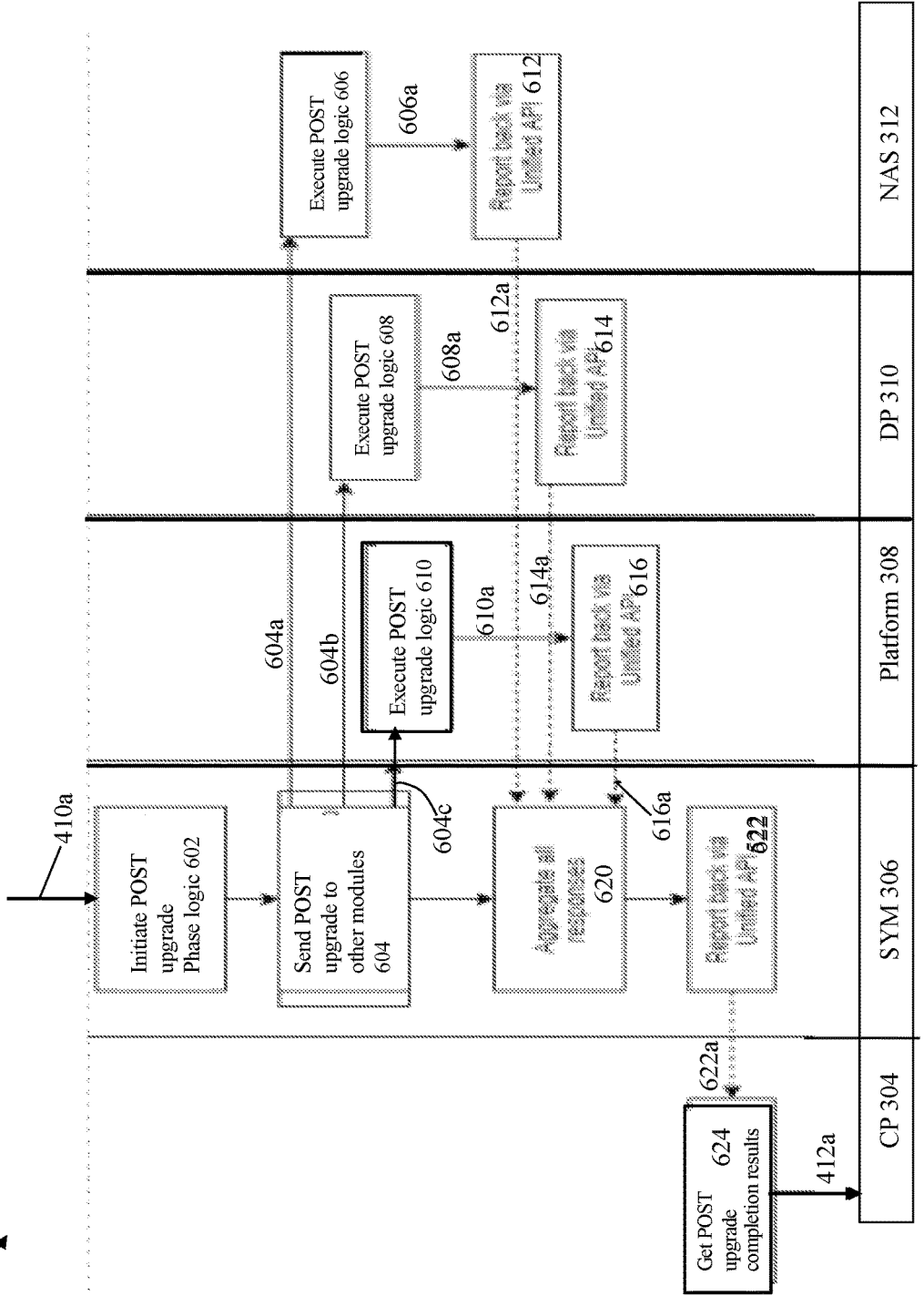

The FIGS. 4 and 5 collectively illustrate overall processing flow. FIGS. 6 and 7 provide further detail of processing that may be performed, respectively, in a main upgrade phase and a post upgrade phase in at least one embodiment.

Referring to FIGS. 4 and 5, shown are flow diagrams of processing that may be performed between the following components or modules of a system: UI 302, CP (control path) 304, SYM (system manager) 306, Platform 308, DP (data path) 310, and NAS (network attached storage) 312. The foregoing modules or components are examples of ones that may be included in one particular embodiment of a dual node appliance or system. Other systems may include different modules or components.

The UI 302 may provide a UI in connection with software, such as a management application, used to perform the upgrade. The CP 304 and the DP 310 may denote, respectively, the control path and the data path as generally described elsewhere herein. In at least one embodiment, an instance of the platform component or module 308, the NAS 312 and the DP 310 may run on each node of the dual node appliance. The platform component 308 may, for example, monitor the node hardware and perform other per node processing in connection with the upgrades. The platform 308 of a node may, for example, install and upgrade the operating system on the node. There may be one instance of the SYM 306 on an appliance or data storage system. The SYM 306 may be characterized as the appliance level manager. In a dual node appliance, the SYM 306 may, for example, communicate with, and coordinate processing between, other components of the two nodes of an appliance when performing upgrades. For example, the SYM 306 may communicate with the two platform components 308 of the two nodes of an appliance in connection with performing upgrades. The NAS component 312 may perform processing in connection with any NAS storage devices of the system or appliance. In at least one embodiment, each node may include an instance of the platform component 308, the DP component 310 and the NAS component 312. In at least one embodiment, one instance of the SYM 306 and the CP 308 may run in each appliance, for example, on one selected node of the dual node appliance.

The example described herein in connection with FIGS. 4 and 5 illustrates processing and modules that may be included in nodes of a single appliance. Additionally, in at least one embodiment in a storage cluster configuration including multiple appliances, each appliance may be managed by an instance of the SYM where all multiple SYMs of the multiple appliances may communicate to perform upgrades on the storage cluster. Although not explicitly illustrated in FIGS. 4 and 5, in such an embodiment, a module or component, such as the CP on one of the appliances in the storage cluster, may initiate and orchestrate upgrades performed on the multiple appliances of the storage cluster.

In at least one embodiment consistent with other discussion herein, each of the components or modules 306, 308, 310 and 312 may define routines that are called or invoked during the upgrade processing based on a defined state machine flow including the following three phases described: a pre upgrade phase, a main upgrade phase and a post upgrade phase. In order to easily reuse code for the different package types or upgrade types, modules or components of the system may implement the state machine with the foregoing 3 phase state machine flow. The state machine uses the 3 generic phases to manage a single component upgrade, invokes other depending modules or components of the system, and aggregates all responses to report back using a unified API.

Referring to FIG. 4, processing begins at the step 320 where the package may be uploaded to the appliance or system, such as a dual node appliance described elsewhere herein. From the step 320, control proceeds to the step 324 where the metadata file describing the uploaded package may be parsed. FIGS. 3A and 3B provide examples of metadata that may be included in a metadata file describing a package including contents for performing one or more types of upgrades. From the step 324, control may proceed (322a) to the step 322 where available package subcomponents denoting package types or upgrade types of the particular package may be presented to the user, for example, such as on a GUI display. In at least one embodiment, the user may select in the step 322 one or more package subcomponents, upgrade types or package types denoting the upgrades to be installed from the package. From the step 322, control may proceed to the step 326.

At the step 326, the CP 304 may receive the list of one or more selected package subcomponents, upgrade types or package types denoting the selected upgrades to be installed from the package. Using the metadata from the metadata file for the package, the CP 304 determines the correct order or sequence of the upgrade of the different selected package subcomponents, upgrade types or package types. As described herein, the order in which the upgrades denoted by the package subcomponents, upgrade types or package types are installed on each node and in the appliance generally may be determined, for example, based on the relative ordering specified in the metadata. For example, the ordering of 4 package subcomponents or package types may be denoted by the elements 206a, 208a, 210a and 254 of the FIGS. 3A and 3B. For purposes of illustration, the first package subcomponent or package type to be installed on the appliance may be the OE package type.

From the step 326, control proceeds to the step 328 to start the session for the next package subcomponent or package type, the OE package type. From the step 328 control proceeds (328a) to the step 330 where the SYM component 306 creates a new session for the current package type, the OE package type. From the step 330, control proceeds to the pre-upgrade phase processing flow 300a. The element 301 describes processing that may be performed as part of the pre upgrade phase 300a when installing a single package type, upgrade type or package subcomponent. From the step 330, the SYM 306 proceeds to the step 332 to initiate the pre upgrade phase logic.

From the step 332, control proceeds to the step 334 where the SYM module 306 of the appliance coordinates processing among the platform components 308 of the two nodes, coordinates processing among the DP components 310 of the two nodes, and coordinates processing among the NAS components 312 of the two nodes. For example, the SYM 306 may initiate pre upgrade phase processing logic 340 on the NAS components 312 of the nodes by calling 334a the pre upgrade phase callback routines of the NAS components 312 of the nodes. Each of the NAS components 312 of the nodes may execute pre upgrade phase processing logic 340 and proceed to the step 342 to report back (342a) to the SYM 306.

The SYM 306 may initiate pre upgrade phase processing logic 344 on the DP components 310 of the nodes by calling 334b the pre upgrade phase callback routines of the DP components 310 of the nodes. Each of the DP components 310 of the nodes may execute pre upgrade phase processing logic 344 and proceed to the step 346 to return or report (346a) results regarding the pre upgrade phase processing to the SYM 306.

The SYM 306 may initiate pre upgrade phase processing logic 348 on the platform components 308 of the nodes by calling (334c) the pre upgrade phase callback routines of the platform components 308 of the nodes. Each of the platform components 308 of the nodes may execute pre upgrade phase processing logic 348 and proceed to the step 350 to report or return (350a) results regarding the pre upgrade phase processing to the SYM 306.

Generally, the SYM 306 may proceed from the step 334 to the step 336 to wait for returns from all the pre upgrade phase processing logic initiated in the step 334 (e.g., where 334a-c denotes the initiated pre upgrade phase logic, and where 342a, 346a, and 350a denote the returns from the initiated pre upgrade phase processing logic of the step 334). In the step 336, the SYM 306 may aggregate all responses received regarding the pre-upgrade phase processing performed by the other components or modules 308, 310 and 312 across all nodes of the appliance. From the step 336, the SYM module 306 proceeds to the step 338 to report information back (338a) regarding the results of the pre upgrade phase. From the step 338, control proceeds to the step 352 where the CP 304 receives results regarding the pre upgrade phase from the SYM 306. From the step 352, control proceeds to the step 354 where the results of the pre upgrade phase processing flow are returned (354a) to the UI 302 and may be displayed 360 to a user, for example, such as on a GUI.

In at least one embodiment, a unified API may be used in the steps 338, 350, 346 and 342, where the unified API provides a common API used by the different modules or components to report information back to the SYM 306. In a similar manner, the same or a different unified API may be used in connection with other processing in an embodiment, for example, by the SYM 306 to communicate with the other modules 308, 310 and 312 to initiate processing of the different phases (e.g., initiate processing denoted by 334a-c).

From the step 354, control proceeds (354b) to the main upgrade phase flow 300b of FIG. 5. In particular, control proceeds (354b) to the step 402 where the CP 304 proceeds to the main upgrade phase. The element 402a may denote the CP module 304 initiating and coordinating processing for the main upgrade phase flow 300b in a manner similar to that as described in connection with the element 301 for the pre upgrade phase flow 300a. In particular, the element 404 may denote the processing performed across the modules 304, 306, 308, 310 and 312 in connection with implementing the main upgrade phase in a manner similar to that as described in connection with the element 301. Further details regarding the element 404 are described in connection with FIG. 6. Once processing denoted by the element 404 is complete, the results of the main upgrade phase flow 404 are returned (404a) to the CP module 304. In the step 406, the CP module 304 reports back (406a) progress to the UI 302. The progress regarding completion of the main upgrade phase may be received in the step 408 by the UI 302, where the UI 302 subsequently displays the received progress or results such as on a GUI display.

From the step 406, control proceeds (406b) to the step 410. In the step 410, the CP module 304 continues with the post upgrade phase by commencing (410a) processing denoted by the element 412.

The element 404a may denote the CP module 304 initiating and coordinating processing for the post upgrade phase flow 300c in a manner similar to that as described in connection with the element 301 for the pre upgrade phase flow 300a. In particular, the element 412 may denote the processing performed across the modules 304, 306, 308, 310 and 312 in connection with implementing the post upgrade phase in a manner similar to that as described in connection with the element 301. Further details regarding the element 412 are described in connection with FIG. 7. Once processing denoted by the element 412 is complete, the results of the post upgrade phase flow 412 are returned (412a) to the CP module 304. In the step 414, the CP module 304 reports back (414a) progress to the UI 302. The progress regarding completion of the post upgrade phase may be received in the step 418 by the UI 302, where the UI 302 subsequently displays the received progress or results such as on a GUI display.

From the step 414, the CP module 304 proceeds to the step 416 where processing continues with the next upgrade type or package type according to the metadata and the selected upgrade types or package types selected by the user in the prior step 322. From the step 416, control proceeds (430) to the 326 of FIG. 4 to perform upgrade processing for the next upgrade type or package type according to the metadata and the selected upgrade types or package types selected by the user in the prior step 322. If processing has completed for all selected upgrade types or package types according to the metadata and the selected upgrade types or package types selected by the user in the prior step 322, control proceeds (416a) to the step 420 to display the final result of the upgrade processing to the user.

The processing flow of FIGS. 4 and 5 generally illustrates a sequential processing of the different selected upgrade types or package types of a package. The particular order of the sequence in which the upgrade types are implemented may be determined in accordance with metadata in the metadata file for the package. In at least one embodiment, the processing flow of FIGS. 4 and 5 may be readily accommodated for use in performing parallel processing for one or more of the upgrade types or package types. Consistent with other discussion herein such as in connection with FIGS. 3A and 3B, the metadata file describing a particular package including multiple package types or upgrade types may indicate which upgrades for the multiple package types or upgrade types may be performed in parallel. In at least one embodiment, one or more modules or components of the system may use information of the metadata file indicating which upgrade types or package types may be upgraded in parallel. For example, in at least one embodiment, the CP 304 and/or SYM 306 may use such information to perform upgrades in parallel on the same node or on different nodes of a system. To further illustrate, for example, consistent with the metadata of FIG. 3A, the CP 304 may initiate and coordinate performing in parallel the upgrades for the language pack upgrade type or package type and the disk firmware upgrade type or package type. The foregoing upgrades may be performed in parallel, for example, on the same appliance or system. The CP 304 may initiate and coordinate performing in parallel the upgrade of the language pack upgrade type or package type in parallel on both nodes of the same appliance.

In a similar manner, other processing such as initiated by the SYM 306 is illustrated as being performed sequentially. For example, FIG. 4 illustrates initiating the pre upgrade phase processing sequentially (e.g., denoted by the arrows 334a-c). In at least one embodiment, the SYM 306 may initiate such processing within the same upgrade phase across one or more other modules or components asynchronously and in parallel. In a similar manner, the processing initiated and coordinated by the SYM 306 in FIGS. 6 and 7 described below and generally elsewhere herein may also be performed asynchronously and in parallel.

Referring to FIG. 6, shown is a flow diagram illustrating in more detail processing that may be performed in connection with the main upgrade phase in at least one embodiment. In particular, FIG. 6 provides further detail of the element 404 of FIG. 5 regarding intermodule communication and coordination initiated by the SYM module 306 in the main upgrade phase. The components or modules and associated flow of FIG. 6 are similar to that as described in connection with the element 301 of FIG. 4.

As denoted by 402*a*, the SYM 306 may proceed to the step 502 to initiate the main upgrade phase logic.

From the step 502, control proceeds to the step 504 where the SYM module 306 of the appliance coordinates processing among the platform components 308 of the two nodes, coordinates processing among the DP components 310 of the two nodes, and coordinates processing among the NAS components 312 of the two nodes. For example, the SYM 306 may initiate main upgrade processing logic 506 on the NAS components 312 of the nodes by calling 504*a* the main phase callback routines of the NAS components 312 of the nodes. Each of the NAS components 312 of the nodes may execute main upgrade processing logic 506 and proceed (506*a*) to the step 512 to return or report (512*a*) results of the main phase performed by the NAS modules 312 to the SYM 306.

The SYM 306 may initiate main upgrade processing logic 504 on the DP components 310 of the nodes by calling 504*b* the main phase callback routines of the DP components 310 of the nodes. In response, each of the DP components 310 of the nodes may execute main upgrade phase processing logic 508 and proceed (508*a*) to the step 514 to return or report (514*a*) results of the main phase performed by the DP modules 310 to the SYM 306.

The SYM 306 may initiate main upgrade processing logic 510 on the platform components 308 of the nodes by calling 504*c* the main upgrade phase callback routines of the platform components 308 of the nodes. Each of the platform components 308 of the nodes may execute main upgrade phase processing logic 510 and proceed (510*a*) to the step 516. In the step 516, results of the main upgrade phase processing performed by the platform components 308 may be returned or reported (516*a*) to the SYM 306.

Generally, the SYM 306 may proceed from the step 504 to the step 520 to wait for returns from all the main phase upgrade processing logic initiated in the step 504 (e.g., where 504*a-c* denotes the initiated main upgrade phase processing logic, and where 512*a*, 514*a* and 516*a* denote the returns from the initiated main upgrade phase processing logic of the step 504). In the step 520, the SYM 306 may aggregate all responses received regarding the main upgrade phase processing performed by the other components or modules 308, 310 and 312. From the step 520, the SYM module 306 proceeds to the step 522 to report information back (522*a*) regarding the results of the main upgrade phase. From the step 522, control proceeds to the step 524 where the CP 304 receives results regarding the main upgrade phase from the SYM 306. From the step 524, results regarding the main upgrade phase may be further returned or reported from the CP 304 to the UI 302.

In at least one embodiment, a unified API may be used in the steps 512, 514, 516, and 522, where the unified API provides a common API used by the different modules or components to report information back to the SYM 306. In a similar manner, the same or a different unified API may be used in connection with other processing in an embodiment, for example, by the SYM 306 to communicate with the other modules 308, 310 and 312 to initiate processing of the main upgrade phase, for example, in the steps 504*a-c*.

Referring to FIG. 7, shown is a flow diagram illustrating in more detail processing that may be performed in connection with the post upgrade phase in at least one embodiment. In particular, FIG. 7 provides further detail of the element 412 of FIG. 5 regarding inter module communication and coordination initiated by the SYM module 306 in the post upgrade phase. The components or modules and associated flow of FIG. 7 are similar to that as described in connection with the element 301 of FIG. 4 and also with FIG. 6.

As denoted by 410*a*, the SYM 306 may proceed to the step 602 to initiate the post upgrade phase logic.

From the step 602, control proceeds to the step 604 where the SYM module 306 of the appliance coordinates processing among the platform components 308 of the two nodes, coordinates processing among the DP components 310 of the two nodes, and coordinates processing among the NAS components 312 of the two nodes. For example, the SYM 306 may initiate post upgrade phase processing logic 606 on the NAS components 312 of the nodes by calling 604*a* the post phase callback routines of the NAS components 312 of the nodes. Each of the NAS components 312 of the nodes may execute post upgrade processing logic 606 and proceed (606*a*) to the step 612 to return or report (612*a*) results of the post phase performed by the NAS modules 312 to the SYM 306.

The SYM 306 may initiate post upgrade phase processing logic 604 on the DP components 310 of the nodes by calling 604*b* the post upgrade phase callback routines of the DP components 310 of the nodes. In response, each of the DP components 310 of the nodes may execute post upgrade phase processing logic 608 and proceed (608*a*) to the step 614 to return or report (614*a*) results of the post upgrade phase performed by the DP modules 310 to the SYM 306.

The SYM 306 may initiate post upgrade processing logic 610 on the platform components 308 of the nodes by calling 604*c* the post upgrade phase callback routines of the platform components 308 of the nodes. Each of the platform components 308 of the nodes may execute post upgrade phase processing logic 610 and proceed (610*a*) to the step 616. At the step 616, the platform components 308 may return or report (616*a*) results of the post upgrade phase processing performed by the platform components 308 to the SYM 306.

Generally, the SYM 306 may proceed from the step 604 to the step 620 to wait for returns from all the post upgrade phase processing logic initiated in the step 604 (e.g., where 604*a-c* denotes the initiated post upgrade phase processing logic, and where 612*a*, 614*a* and 616*a* denote the returns from the initiated post upgrade phase processing logic of the step 604). In the step 620, the SYM 306 may aggregate all responses received regarding the posy upgrade phase processing performed by the other components or modules 308, 310 and 312. From the step 620, the SYM module 306 proceeds to the step 622 to report information back (622*a*) regarding the results of the main upgrade phase. From the step 622, control proceeds to the step 624 where the CP 304 receives results regarding the post upgrade phase from the SYM 306. From the step 624, results regarding the post upgrade phase may be further returned or reported from the CP 304 to the UI 302.

In at least one embodiment, a unified API may be used in the steps 612, 614, 616, and 622, where the unified API provides a common API used by the different modules or components to report information back to the SYM 306. In a similar manner, the same or a different unified API may be used in connection with other processing in an embodiment, for example, by the SYM 306 to communicate with the other modules 308, 310 and 312 to initiate processing of the main upgrade phase, for example, in the steps 604*a-c*.

What will now be described are examples of processing that may be performed during the various upgrade phases for particular package types or upgrade types. For example, consider the package type or upgrade type DP compression having associated metadata as described and illustrated in connection with FIG. 3B. In at least one embodiment, performing the DP compression upgrade may result in performing upgrade processing in the DP component or module 310 but not the platform 308 or NAS components 312 of the nodes. In this case, callbacks or routines of the platform 308 and NAS 312 modules that are invoked in the pre, main and post upgrade phases may simply return and not perform any other processing. In the DP module 310, pre upgrade phase processing may, for example, remove or uninstall an existing compression algorithm and may disable deduplication if currently enabled. The DP module's main upgrade phase processing may, for example, install the new compression algorithm. The DP module's post upgrade phase processing may, for example, enable compression processing and perform one or more tests that test and verify that the new compression algorithm is installed and properly compressing data files. The DP module's post upgrade phase processing may perform tests that compress one or more files and verify that the new compression algorithm is installed and operates properly using one or more supported UIs. For example, commands or command line options to compress a file may be issued using a GUI and also a CLI (command line interface) with supported compression options. The DP module's post upgrade phase processing may, for example, restore a prior setting for deduplication that may have been previously disabled by the DP module's pre upgrade phase processing.

As another example, consider the package type or upgrade type OE having associated metadata as described and illustrated in connection with the section 206 of FIG. 3A. In at least one embodiment, performing the OE upgrade may include enabling selected operating system security features that affect the platform component 308. In such an embodiment, the pre upgrade phase performed by the platform component 308 may include verifying that operating system on each node is a particular operating system version known to have the desired security features to be enabled. The pre upgrade phase processing of the platform component 308 may also include installing any needed operating system upgrades to the particular operating system version. The main processing phase of the platform component 308 of a node may include enabling the selected operating system security features and, rebooting the node to utilize the new security features. The post processing phase of the platform component 308 may include performing one or more tests to verify that the newly enabled security features are operating properly. In this case, callbacks or routines of the platform 308 module or component are invoked in the pre, main and post upgrade phases to perform the above-noted processing.

In at least one embodiment, APIs may be defined and used in connection with performing rollbacks and retries. For example, in at least one embodiment, processing performed during any of the pre phase, main phase or post phase may attempt to perform an operation that may be attempted or retried up to a specified maximum number of tries. If the operation does not succeed, rollback processing may be performed as needed to rollback or undo any other operations that may have completed successfully. In connection with some phase processing, it may be that a set of multiple operations that are implemented or performed atomically in that all the multiple operations are completed successfully, or otherwise none of the multiple operations should be implemented. In this case, where a first of the multiple operations succeeds and then a second of the multiple operations fails, the system may use the concept of a rollback to undo the first operation and restore the system to a state as prior to performing the first operation.

In at least one embodiment in accordance with the techniques, an optimization may be performed in connection with one or more upgrade types or package types. Although the processing flow of FIGS. 4, 5, 6 and 7 illustrate calling callbacks or routines of modules or components for all phases of the state machine, an embodiment may further customize or modify processing for a particular package type or upgrade type, for example, so as not to invoke selected routines or callbacks of one or more of the phases that would otherwise simply perform no processing and return.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A computer implemented method of performing upgrades comprising:
  receiving a package including a plurality of upgrade types each identifying a different upgrade subcomponent of the package;
  receiving a metadata file describing the package;
  receiving selection information identifying one or more of the plurality of upgrade types of the metadata file, wherein the one or more upgrade types identified by the selection information denote one or more corresponding upgrade subcomponents of the package to be upgraded; and
  performing first processing that upgrades a system in accordance with the metadata file and the selection information, wherein said first processing includes:
    invoking a plurality of modules of the system to install the one or more corresponding upgrade subcomponents of the package on the system, wherein, for each of the one or more corresponding upgrade subcomponents installed, each of the plurality of modules implements a state machine including a pre upgrade phase, a main upgrade phase and a post upgrade phase.

2. The method of claim 1, wherein the selection information identifies at least two of the plurality of upgrade types having at least two corresponding upgrade subcomponents of the package, and wherein the method further comprises:
determining, in accordance with the metadata file and the selection information, an order in which the at least two corresponding upgrade subcomponents of the package are installed on the system.

3. The method of claim 2, wherein the metadata file includes a plurality of metadata sections for the plurality of upgrade types, wherein each of the plurality of metadata sections includes corresponding metadata for a different one of the plurality of upgrade types.

4. The method of claim 3, wherein the order in which the at least two corresponding upgrade subcomponents of the package are installed on the system is determined in accordance with first metadata of at least two of the plurality of metadata sections describing the at least two upgrade types of the selection information.

5. The method of claim 3, wherein the at least two corresponding upgrade subcomponents of the package selected for installation includes a first upgrade subcomponent and a second upgrade subcomponent installed in parallel, and wherein two metadata sections of the metadata file indicate that it is allowable for the first upgrade subcomponent and a second upgrade subcomponent to be installed in parallel.

6. The method of claim 5, wherein the first upgrade subcomponent and the second upgrade subcomponent are installed in parallel on the same node.

7. The method of claim 5, wherein the first upgrade subcomponent and the second upgrade subcomponent are installed in parallel on two different nodes.

8. The method of claim 3, wherein a first upgrade type of the plurality of metadata types is described by a first metadata section of the plurality of metadata sections, and wherein the first metadata section indicates a dependency between the first upgrade type and a second upgrade type of the plurality of metadata types.

9. The method of claim 8, wherein the dependency denotes that a pair of upgrade subcomponents of the package corresponding to the first upgrade type and the second upgrade type are required to be installed when any one or more of the first upgrade type and the second upgrade type is selected for upgrade and installation.

10. The method of claim 1, wherein, for said each corresponding upgrade subcomponent installed, the plurality of modules includes a first plurality of first code entities that performs pre upgrade phase processing, a second plurality of second code entities that performs main upgrade phase processing, and a third plurality of third code entities that performs post upgrade phase processing.

11. The method of claim 10, wherein installing said each corresponding upgrade subcomponent in the first processing includes invoking the first plurality of code entities of the plurality of modules to perform pre upgrade phase processing, invoking the second plurality of code entities of the plurality of modules to perform main upgrade phase processing, and invoking the third plurality of code entities of the plurality of modules to perform post upgrade phase processing.

12. The method of claim 11, wherein execution of main upgrade phase does not start until the pre upgrade phase has completed, and wherein execution of the post upgrade phase does not start until the main upgrade phase has completed.

13. The method of claim 12, wherein all of the first plurality of code entities of the plurality of modules performing the pre upgrade phase processing complete executing prior to commencing execution of any of the second plurality of code entities of the plurality of modules performing the main upgrade phase processing.

14. The method of claim 13, wherein all of the second plurality of code entities of the plurality of modules performing the main upgrade phase processing complete executing prior to commencing execution of any of the third plurality of code entities of the plurality of modules performing the post upgrade phase processing.

15. A non-transitory computer readable medium comprising code stored thereon that,
when executed, performs a method of performing upgrades comprising:
receiving a package including a plurality of upgrade types each identifying a different upgrade subcomponent of the package;
receiving a metadata file describing the package;
receiving selection information identifying one or more of the plurality of upgrade types of the metadata file, wherein the one or more upgrade types identified by the selection information denote one or more corresponding upgrade subcomponents of the package to be upgraded; and
performing first processing that upgrades a system in accordance with the metadata file and the selection information, wherein said first processing includes:
invoking a plurality of modules of the system to install the one or more corresponding upgrade subcomponents of the package on the system, wherein, for each of the one or more corresponding upgrade subcomponents installed, each of the plurality of modules implements a state machine including a pre upgrade phase, a main upgrade phase and a post upgrade phase.

16. A system comprising:
one or more processors; and
one or more memories comprising code stored thereon that, when executed, performs a method of performing upgrades comprising:
receiving a package including a plurality of upgrade types each identifying a different upgrade subcomponent of the package;
receiving a metadata file describing the package;
receiving selection information identifying one or more of the plurality of upgrade types of the metadata file, wherein the one or more upgrade types identified by the selection information denote one or more corresponding upgrade subcomponents of the package to be upgraded; and
performing first processing that upgrades a system in accordance with the metadata file and the selection information, wherein said first processing includes:
invoking a plurality of modules of the system to install the one or more corresponding upgrade subcomponents of the package on the system, wherein, for each of the one or more corresponding upgrade subcomponents installed, each of the plurality of modules implements a state machine including a pre upgrade phase, a main upgrade phase and a post upgrade phase.

* * * * *